United States Patent [19]

Mürdter et al.

[11] Patent Number: 4,799,559
[45] Date of Patent: Jan. 24, 1989

[54] MEASURING APPARATUS

[75] Inventors: Herbert Mürdter, Albstadt; Adolf Ast, Messstetten, both of Fed. Rep. of Germany

[73] Assignee: August Sauter GmbH, Albstadt, Fed. Rep. of Germany

[21] Appl. No.: 172,442

[22] Filed: Mar. 24, 1988

[30] Foreign Application Priority Data

Mar. 25, 1987 [DE] Fed. Rep. of Germany ....... 3709717

[51] Int. Cl.[4] ............................................. G01G 23/02
[52] U.S. Cl. .................................. 177/124; 177/125; 177/25.1
[58] Field of Search .................... 177/25.15, 124, 128, 177/125; 364/466, 567

[56] References Cited

U.S. PATENT DOCUMENTS

| 4,377,214 | 3/1983 | Hansen et al. | 177/25.15 |
| 4,423,486 | 12/1983 | Berner | 177/25.15 X |
| 4,506,330 | 3/1985 | Dlugos | 177/25.15 X |
| 4,586,575 | 5/1986 | Müerdter et al. | 177/124 |
| 4,597,457 | 7/1986 | Ikekita | 177/25.15 |
| 4,601,355 | 7/1986 | Takahashi | 177/128 |

Primary Examiner—George H. Miller, Jr.
Attorney, Agent, or Firm—Holman & Stern

[57] ABSTRACT

A scale-type measuring apparatus, particularly a weighing apparatus, for use in commerce where calibration is required, comprises a sensor (1) which generates a signal representing a measured quantity, a separate readout device (3) disposed remotely from the sensor (1), a signal line (2) connecting the sensor to the readout device and an identification plate (7) for displaying authenticated values of technical measurement parameters of the sensor (1) on the readout device (3). In order to maintain the official calibration identification plate (7) must be unremovably linked to the sensor (1) and in order to enable separate handling of the sensor (1) and the readout device (3) despite this required permanent linkage of the identification plate (7) to the sensor (1), the signal line (2) is inseparably connected to the sensor (1), and the identification plate (7) is unremovably attached to and guided on the signal line (2), so that the identification plate (7) remains linked to the sensor (1) even if the coupling (5, 6) with the readout device is released. A characterizing number (integer) may be set (19) on identification plate (7), this setting being secured by a lead seal (21) applied at the time of official calibration.

20 Claims, 1 Drawing Sheet

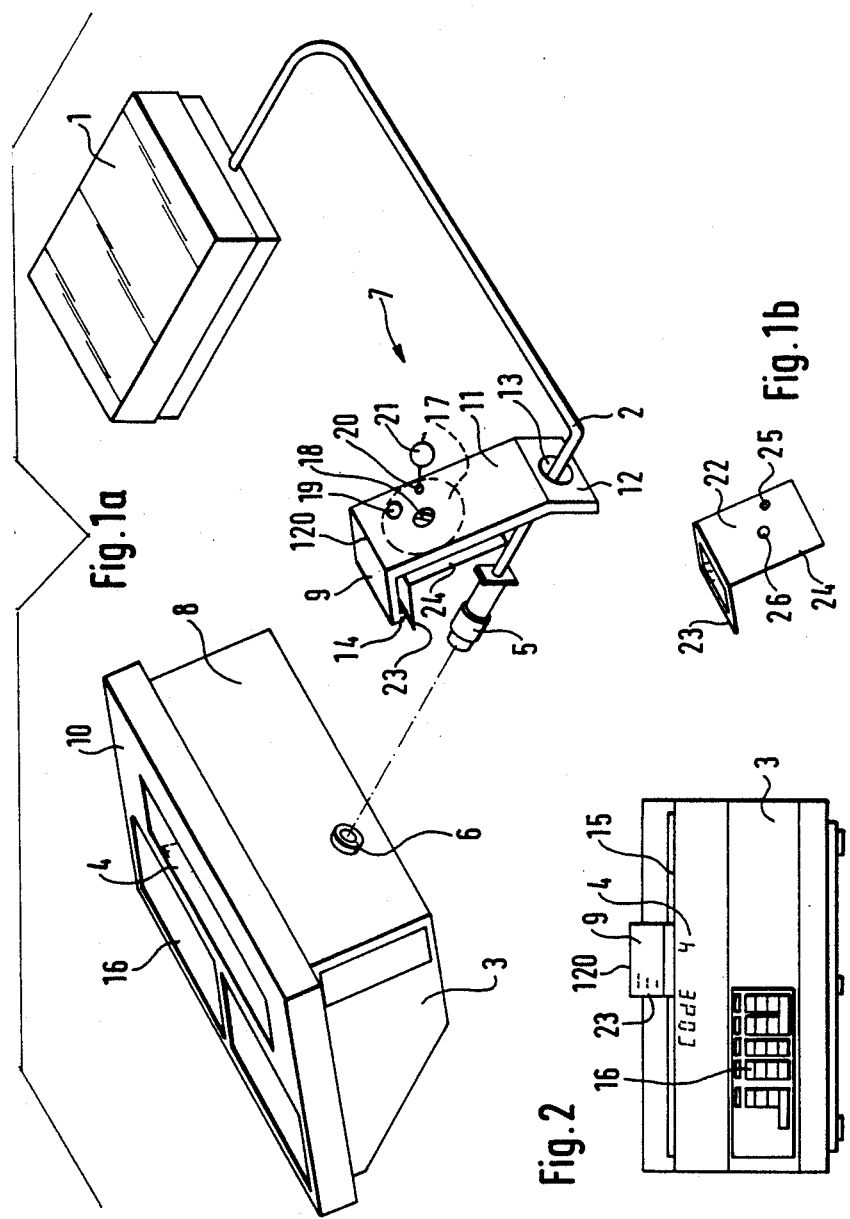

MEASURING APPARATUS

BACKGROUND OF THE INVENTION

1. Field Of The Invention

The invention relates to a measuring apparatus, and more particularly a scale-type weighing apparatus wherein a sensor produces a digital value output signal which directly represents the measured quantity and its units of measure displayed on a visual display readout device disposed physically separate from the sensor and connected to the sensor by a signal line and which has an identification plate which serves as a display means for the technical measurement parameters of the sensor.

2. Description Of The Prior Art

When such measuring apparatuses are used in commerce where calibration is a requirement, it is not only advantageous but also mandatory, under national and international calibration regulations, that the identification plate with the technical measurement parameters be mounted in proximity to the display device which displays the measured quantities. In a weighing apparatus, for example, the parameters include data on the maximum load, the scale division on the display, the tare range, i.e., range of weights for which the scale can be set to subtract a tare, etc. However, there is also a requirement that the particular identification plate be unambiguously associated with the given sensor. Accordingly, in known measuring apparatuses there cannot be provision for breaking the connection between the sensor and the readout device, which connection is supplied solely by the signal line. If any releasable couplings exist between the signal line and the readout device, these must be sealed with lead, in known measuring apparatuses. If the coupling is broken, the lead seal is destroyed, which, according to regulation, necessitates recalibration, because the connection between the components has been broken. Therefore in order to avoid recalibration, one must always handle the entire measuring apparatus as a connected unit, which in practice has a number of disadvantages, particularly if the readout device or the weighing bridge containing the sensor is movable from location to location.

The inconvenience of recalibrating is particularly presented if the weighing bridge containing the sensor, or the readout device, develops a malfunction and must be replaced. In this case, various lead seal locations must be disturbed, following which the entire apparatus must be recalibrated and re-sealed with lead seals. This is very costly and consumptive of time and resources, particularly with large scales in the heavy load range of 500 kg or more. Moreover, there are substantial problems which arise in the case of a composite scale comprised of a plurality of weighing bridges each of which includes a sensor, which bridges are connected to a single readout device.

Another disadvantage is present in weighing apparatuses wherein the weighing bridges which contain the sensors are mounted in a cavity ("well") at a depressed level, so as to be inaccessible at ground level. In order to gain access to the lead seal locations on the sensors, to check whether the lead seals in the well have been disturbed, in general it is necessary to remove the heavy weighing plate. Thus there is a need for means whereby the lead seal locations are disposed outside the region of the weighing bridge, in a readily accessible place.

BRIEF SUMMARY OF THE INVENTION

An object of the invention is to devise a measuring apparatus, particularly a weighing apparatus, of the type described above wherein the sensor or the readout device may be replaced without the necessity to recalibrate the entire measuring apparatus.

This object is achieved according to the invention in that the identification plate is releasably mounted on the readout device, and is inseparably connected to the sensor via a connecting member so that the readout device can be completely separated from the sensor without disturbance of the connection between the calibrated sensor and the identification plate which plate is the controlling factor as regards calibration, i.e., as regards any requirement to recalibrate. There is no requirement for the identification plate to be disposed on the sensor itself. Hence it is readily disposed on the readout device which is in a location different from the location of the sensor. In particular, the identification plate is disposed near the visual display device which displays the measured quantity.

In a particularly advantageous embodiment of the invention, the connecting member is formed by the signal line itself, which is inseparably connected to the sensor, and the identification plate is unremovably linked to the end of the signal line which is nearest the readout device With this embodiment, the signal line, which must be present in any event, is used as the above-mentioned connecting member, thereby providing a very simple solution to overcome the above problems.

According to an advantageous refinement of the invention, the signal line is passed through a bore in the identification plate, the diameter of which bore is greater than the outer diameter of the body of the signal line but less than that of the end of the signal line which is releasably coupled to the readout device. This embodiment simplifies handling, because the identification plate is movable on the signal line and therefore is easy to remove from the readout device. The fact that the end of the signal line is wider than the bore of the identification plate ensures that the identification plate will be held securely on the signal line and thereby will remain unremovably linked to the sensor.

It is also provided, within the scope of the invention, that the sensor has a non-volatile memory for a characteristic integer, such as a number, which serves as a code word for the current parameter settings of the sensor; the sensor further has input means and circuitry for automatic shifting of the characteristic integer by a specified amount upon each subsequent setting of parameters, as well as means for storing this updated characteristic integer as a new code word in the non-volatile memory; and a character storage element, i.e., a fixed display device, provided with the current characteristic number is disposed on the identification plate and is secured there by a lead seal. Thus, if parameter settings of the sensor are changed, e.g., in resetting its sensitivity, or units of measure, which may be accomplished, e.g., from the readout device itself by control commands input to the sensor via the signal line, there will be an automatic shift of the characteristic number representing the prior calibration, or setting, and the updated number will be stored. This stored characteristic number may then be queried and compared with the characteristic number visible on the identification plate; thus, at any time one can determine whether the calibration of the measuring apparatus has been changed. If so, a recalibration is required at the end of which the lead seal which binds the character storage element and the identification plate together is broken and the new characteristic number is mounted and its character storage element is sealed to the identification plate by means of a lead seal. This proves that the recalibration procedure has been in accordance with official regulations.

In this connection, in a structurally particularly advantageous embodiment, the character storage element is formed by a disc which is rotatably mounted on a surface region of the identification plate, which disc is provided in an azimuthal direction with a series of the possible characterizing numbers (integers), and a window is provided in the identification plate through which only the currently valid characterizing number is visible. The rotational position of the disc with respect to the window is fixed by the lead seal. With this embodiment, after a recalibration one need only to rotate the disc until the updated characterizing integer appears in the window. The lead seal is then applied with the disc in this position.

According to a further inventive concept, it is provided that the technical measurement parameters of the sensor are disposed on a second character storage element which is also secured to the identification plate by the lead seal. In this way, the character storage element may be replaced readily by a new character storage element which bears the new technical measurement parameters underlying the new calibration. A new lead seal would have to be applied in any event when the recalibration is carried out; under this novel concept, the new seal also ensures that the character storage element itself cannot be changed, i.e., neither character storage element can be changed, without detection.

In an advantageous refinement of this embodiment, the character storage element for the technical measurement parameters of the sensor is disposed between the readout device and the identification plate, with the identification plate being form-interlockingly mounted on and against the readout device, and the plate is transparent in the region of the second character storage element. In this way, the character storage element is compressively held between the identification plate and the abutting surface of the readout device, against which surface the identification plate, and thus the character storage element, is form-interlockingly held. The character storage element is visible through and protected by the transparent region of the identification plate.

The invention also includes the concept of providing the identification plate with an electrical keypad device for entering the current characterizing integers of the character storage element and providing the readout device with a comparator for the number keyed in on the keypad and the number stored in the sensor, whereby the sensor is rendered inoperative, or locked, if the numbers do not match. Thereby, if the last official calibration is no longer valid, the measuring apparatus is automatically blocked.

Alternatively, or additionally, according to another embodiment the readout device may be provided with a visual display device for the characterizing integer stored in the sensor. By visual comparison of the characterizing integer displayed on the readout device and that appearing on the identification plate, one can determine at any time whether they correspond, i.e., whether the current parameter settings are validated by an official calibration.

It is particularly easy to mount the identification plate on the readout device if the identification plate has snap-in projections whereby it is releasably affixed to corresponding configurations on the readout device. Alternatively, according to another advantageous embodiment the identification plate may have a magnetic arrangement which holds it firmly to the readout device. In both cases, the identification plate may then be released by simply pulling it off of the readout device by hand, so that after the coupling between the signal line and the readout device is released the readout device may be handled completely separately from the sensor. Thus in the event of failure of the readout device the readout device may be readily replaced without disturbing the calibration which is still valid for the sensor. Similarly, the sensor may be replaced by another, already calibrated sensor.

BRIEF DESCRIPTION OF THE DRAWINGS

Additional features, details, and advantages of the invention will be apparent from the following description with reference to the accompanying drawings wherein:

FIG. 1a is a schematic perspective overall view of a weighing apparatus comprised of a readout device, a weighing bridge, a connecting signal line, and an identification plate;

FIG. 1b is a perspective view of a character storage element for the identification plate; and FIG. 2 is a front elevational view of the readout device.

DETAILED DESCRIPTION

All details of the drawings not explicitly mentioned in the text are expressly incorporated herein by reference, for purposes of disclosure of the invention.

In the weighing apparatus illustrated in FIG. 1a a sensor 1 is provided in a weighing bridge (not shown), whereby the weight of a load placed on the weighing bridge is determined and is converted into a corresponding measurement quantity. The sensor 1 is designed such that its output signal comprises a digital value which represents the measured quantity, namely the weight, directly in its unit of measure. Thus, the output signal does not require any further processing in the nature of valuation, but can be displayed directly on the display device to represent the weight. A signal line 2 is inseparably connected to the sensor 1. The signal line 2 carries the output signal of the sensor 1 to the readout device 3 which is at a different location from the sensor. A visual display device 4 in the readout device 3 visually displays the weight and its units of measure.

Whereas the signal line 2, which is the sole connecting member between the sensor 1 and the readout device 3, is inseparably connected to the sensor 1 on its (the signal line's) end disposed toward the sensor, the other end of the signal line, directed toward the readout device 3, forms one member 5 of a plug coupling which plugs into a complementary coupling member 6 on the readout device 3. The coupling formed by members 5 and 6 thus provides a releasable connection between the readout device 3 and the weighing bridge 1; the connection is shown released in FIG. 1a.

An angle-shaped identification plate 7 has a cross-sectional profile which matches that of a region of the rear side 8 of the readout device 3, which region bears the complementary coupling member 6. One leg 9 of the identification plate (see FIG. 2) extends over a region of the front side 10 of readout device 3, which region is near the visual display 4. The other leg 11 extends from the corner 120 over the rear side 8 and beyond the coupling member 6. The free end region 12 of leg 11 is provided with a bore 13 having a signal line 2 which passes through it, and slightly smaller than the end coupling member 5 of the signal line 2. In this way, the identification plate 7 is reliably held on the signal line 2 and is unremovably connected to the sensor 1 of the weighing bridge. When the coupling 5, 6 is coupled, the identification plate 7 is form-interlockingly mounted on the readout device 3 by means of the snap-connector strip, or edge, 14 disposed on the free end of leg 9, which strip 14 engages a corresponding cooperative slot 15 on the readout device 3. To separate the weighing bridge containing sensor 1 and the identification plate 7 from the readout device 3, as shown in FIG. 1a, one releases the snap connection 14, 15 to remove plate 7 and separates the coupling members 5 and 6.

The sensor 1 provided in the weighing bridge is further designed such that control signals sent over the signal line 2 can be used to reset the parameters of the sensor, e.g., to change the sensitivity or units of measure, or to trigger a self-recalibration. For this purpose the readout device 3 is provided with a keypad 16 for entering the corresponding control commands. The sensor 1 has a non-volatile memory wherein a characteristic integer is stored which represents a code word for the currently valid calibration of the sensor. This memory may be comprised of, e.g., an EAROM. A logic device, also provided in the sensor 1, is actuated in response to each command for resetting of parameters, or recalibration, whereby the characteristic integer is shifted by a specified quantity, and the thus updated characteristic integer is stored as the new code word, in the non-volatile memory. The characteristic integer forming the new code word may be displayed permanently, or may be displayed when queried by a specified key on the keypad 16 on the readout device 3. The display may be via, e.g., the visual display device 4.

A disc 17 is rotatably mounted on the leg 11 of the identification plate 7, which leg 11 extends along the rear side 8 of the readout device 3 when the system is in the coupled state. Along a circle on the disc 17 which circle is concentric with the pivot 18, a sequence of characterizing integers, such as numbers, is permanently impressed, which integers correspond to the sequence of possible characterizing integers of the sensor. These integers are spaced at equal angular distances. The disc 17 thus forms a character storage element. The leg 11 of the identification plate 7 has a window 19 at a radial distance from pivot 18 which distance corresponds to the radial location of the circle of characterizing integers. The integers are disposed against the inner side of the angular identification plate 7, which inner side faces the readout device 3. One of the characterizing integers on disc 17 is visible through the window 19. Disc 17 has bores (not shown) in it which may be arrayed in a circle and are spaced at the same angular interval as the characterizing integers. For each such integer a bore in disc 17 aligns with a bore 20 in leg 11 when the integer lies under the window 19. The diameters of these bores allow a wire of a lead seal 21 to be passed through both of them at once, thereby providing lead seal means to lock the disc 17 in a given rotational position with respect to the window 19. After a calibration has been completed, the characterizing integer visible through window 19 is set to correspond to the characterizing integer stored in the non-volatile memory of the sensor 1. When characterizing parameters of the sensor 1 are changed, the characterizing integer in the memory of the sensor will be changed, so that said integer will differ from the integer fixed in the window 19; thereby indication is given that a recalibration is required. In the course of such an officially accomplished recalibration, the disc 17 will be reset accordingly, and will be resealed in place with a new lead seal.

With each resetting of parameters of the sensor and each recalibration, the technical measurement parameters are changed which are to be displayed on the identification plate 7 near the display device 4. For this purpose a second character storage element 22 is provided (FIG. 1b) which has an L-shaped cross section. Leg 23 of element 22 bears the appropriate technical measurement parameters and extends along the inner surface of leg 9 of the identification plate 7 which latter leg normally rests against the readout device 3. The other leg 24 of element 22 extends along the inner surface of leg 11 of identification plate 7, which latter leg has the bore 20 therein. Leg 24 has a bore 25 which aligns with and matches the bore 20 of plate 7 and which is also penetrated by the wire of lead seal 21, whereby the character storage element 22 is also secured to plate 7 by seal 21, and thereby is held in fixed relationship with sensor 1 of the weighing bridge. The leg 24 may have a second opening 26 in the region of the pivot 18. Leg 9 of the identification plate 7 is transparent, so that when it is clipped onto the readout device 3 as shown in FIG. 2 the technical measurement parameters borne on leg 23 of the character storage element 22, which is held fixed between the readout device and the inner side of leg 9 of identification plate 7, are visible through plate 7. Alternatively to the releasable snap-fastening strip 14 and cooperating slot 15, one may provide, e.g., a magnetic device whereby the identification plate 7 is held on the readout device 3 by magnetic force.

The identification plate 7 may further have an electrical keypad device (not shown) for entering the current characterizing integer to be established in the window 19. If, e.g., disc 17 bears a sequence of integers 1-16 in a circular array, the representation of the numbers can be furnished by four concentric paths on disc 17, which paths are assembled from alternatively electrically conducting and nonconducting layers, according to a prescribed coding. These paths are electrically sensed by a sliding contact, or brush for example, whereby for each characterizing integer to be fixed in window 19 a unique 4-bit code is sensed. The sensed signal is compared with a characterizing integer stored in the sensor 1; a comparator (not shown) provided in the readout device 3 is used for this comparison. If the two integers do not agree, the output of the measured quantity by the readout device 3 is blocked by the output of the comparator.

As may be seen from the foregoing description, if a problem develops in the readout device 3 the coupling 5, 6 can be released and the identification plate 7 can be removed from the readout device 3, whereby a different readout device can be connected to coupling member 5. In this exchanging process, there is no change in the calibration, or setting, of the sensor 1 which is provided in the weighing bridge. Therefore, it is unnecessary to recalibrate the sensor. The identification plate 7 which is unremovably connected to the sensor 1 is affixed to the new readout device, and bears the validation of the calibration of the sensor. If the sensor 1 itself develops a problem and must be replaced, a new, already calibrated sensor 1, provided with a new signal line 2, an identification plate 7, and a characterizing integer set on the plate 7 and locked with a lead seal, may be readily connected to the readout device 3. Accordingly, the entire weighing apparatus remains ready to operate, without the necessity of recalibrating the entire apparatus.

We claim:

1. In a measuring apparatus including a sensor producing an output signal as a digital value directly representing the measured quantity and its units of measure, a separate readout device for the measured quantity disposed physically remote from the sensor, a signal line connecting the sensor to the readout device for conducting the output signal to the readout device, a visual display on the readout device for displaying the measured quantity and its units of measure, and an identification plate for displaying the technical measurement parameters of the sensor, the improvement wherein;
   the identification plate is releasably mounted on the readout device; and
   a connecting member is provided unremovably linking said identification plate to the sensor.

2. A measuring apparatus as claimed in claim 1 wherein:
   said connecting member comprises the signal line itself;
   said signal line has one end thereof inseparably connected to the sensor and the other end thereof connected to the readout device; and
   the identification plate is unremovably linked to said signal line adjacent said other end thereof.

3. A measuring apparatus as claimed in claim 2 wherein:
   said visual display on the readout device further comprises means for displaying the characteristic integer stored in the sensor.

4. A measuring apparatus as claimed in claim 2 wherein:
   snap-on projections are provided on the identification plate; and
   corresponding configuration means is provided on the readout device for releasably receiving said projections for attaching the identification plate on the readout device.

5. A measuring apparatus as claimed in claim 2 wherein:
   magnetic means is provided on at least the identification plate for releasably retaining the identification plate firmly on the readout device.

6. A measuring apparatus as claimed in claim 2 wherein:
   said signal line has an enlarged other end releasably coupled to the readout device;
   a bore is provided in the identification plate having a diameter greater than the diameter of the signal line, but less than that of said enlarged end of the line; and
   said signal line passes through said bore.

7. A measuring apparatus as claimed in claim 6 wherein:
   said sensor has a non-volatile memory for a characteristic integer;
   said integer serves as a code word for the current parameter settings of the sensor;
   said sensor further has means for automatic shifting of said characteristic integer by a specified quantity upon each subsequent setting of parameters to produce an updated current characteristic integer;
   said sensor has means for storing said updated current characteristic integer as a new code word in said non-volatile memory; and
   a first character storage element displaying the current characteristic integer is disposed on the identification plate and is secured there by a lead seal.

8. A measuring apparatus as claimed in claim 6 wherein:
   said visual display on the readout device further comprises means for displaying the characteristic integer stored in the sensor.

9. A measuring apparatus as claimed in claim 6 wherein:
   snap-on projections are provided on the identification plate; and
   corresponding configuration means is provided on the readout device for releasably receiving said projections for attaching the identification plate on the readout device.

10. A measuring apparatus as claimed in claim 1 wherein:
    said sensor has a non-volatile memory for a characteristic integer;
    said integer serves as a code word for the current parameter settings of the sensor;
    said sensor further has means for automatic shifting of said characteristic integer by a specified quantity upon each subsequent setting of parameters to produce an updated current characteristic integer;
    said sensor has means for storing said updated current characteristic integer as a new code word in said non-volatile memory; and
    a first character storage element displaying the current characteristic integer is disposed on the identification plate and is secured thereto by a lead seal.

11. A measuring apparatus as claimed in claim 10 wherein:
    said character storage element is formed by a disc rotatably mounted on a surface region of the identification plate;
    said disc is provided in an azimuthal direction with a series of possible characteristic integers;
    a window is provided in the identification plate through which only the currently valid characteristic integer is visible; and
    said lead seal fixes the rotational position of said disc with respect to said window.

12. A measuring apparatus as claimed in claim 11 and further comprising:
    an electrical keypad device on the identification plate for entering the current characteristic integers of the character storage element; and
    a comparator on the readout device for comparing the characteristic integer keyed in on said keypad and the characteristic integer stored in the sensor, and for blocking the output of the measured quantity when said integers do not match.

13. A measuring apparatus as claimed in claim 10 wherein:
    a second character storage element is secured to the identification plate by said lead seal; and the technical measurement parameters of the sensor are disposed on said second character storage element.

14. A measuring apparatus as claimed in claim 13 wherein:
said second character storage element is disposed between the readout device and the identification plate;
the identification plate is form-interlockingly mounted on the readout device; and
the identification plate is transparent in a region thereof extending over at least part of said second character storage element.

15. A measuring apparatus as claimed in claim 13 and further comprising:
an electrical keypad device on the identification plate for entering the current characteristic integers of the character storage element; and
a comparator on the readout device for comparing the characteristic integer keyed in on said keypad and the characteristic integer stored in the sensor, and for blocking the output of the measured quantity when said integers do not match.

16. A measuring apparatus as claimed in claim 10 and further comprising:
an electrical keypad device on the identification plate for entering the current characteristic integers of the character storage element; and
a comparator on the readout device for comparing the characteristic integer keyed in on said keypad and the characteristic integer stored in the sensor, and for blocking the output of the measured quantity when said integers do not match.

17. A measuring apparatus as claimed in claim 10 wherein:
a second character storage element is secured to the identification plate by said lead seal; and
the technical measurement parameters of the sensor are disposed on said second character storage element.

18. A measuring apparatus as claimed in claim 1 wherein:
said visual display on the readout device further comprises means for displaying the characteristic integer stored in the sensor.

19. A measuring apparatus as claimed in claim 1 wherein:
snap-on projections are provided on the identification plate; and
corresponding configuration means is provided on the readout device for releasably receiving said projections for attaching the identification plate on the readout device.

20. A measuring apparatus as claimed in claim 1 wherein:
magnetic means is provided on at least the identification plate for releasably retaining the identification plate firmly on the readout device.

* * * * *